United States Patent Office 3,360,573
Patented Dec. 26, 1967

3,360,573
PROCESS OF PREPARING ALKYLATED
HYDROXY AROMATIC COMPOUNDS
John M. Walts, Clark, and Leslie M. Schenck, Mountainside, N.J., assignors to General Aniline & Film Corporation, New York, N.Y., a corporation of Delaware
No Drawing. Filed Aug. 10, 1964, Ser. No. 388,694
10 Claims. (Cl. 260—624)

ABSTRACT OF THE DISCLOSURE

Aromatic hydroxy compounds containing from 1 to 3 hydroxy groups directly attached to the aromatic nucleus are readily alkylated by reacting said compounds with a monohalogenated alkyl halide, i.e. chloride, bromide or iodide, of from 2 to 30 carbon atoms at a temperature of from about 100° C. to about 250° C. in the presence of raw clay of the silica-alumina type as catalyst, maintaining the said temperature within the said range for 1 to 24 hours and isolating the alkylated hydroxy aromatic compound from said reaction.

This invention relates to an improved process of preparing alkyl-substituted hydroxy aromatic compounds.

There are numerous methods available to the art for the preparation of alkylated hydroxy aromatic compounds. One general method consists of alkylating aromatic hydroxy compounds, preferably phenolic bodies, with mono-olefins by flowing the phenolic body in a liquid phase downwardly in contact with a silica-alumina adsorbent catalyst while flowing of the vapors of the mono-olefin in an amount so as to provide 2 to 4 moles of olefin per mole of phenolic body upwardly in contact with the phenol and catalyst at a temperature of about 250° F. to about 350° F. and a pressure of about 250 to 350 p.s.i. The disadvantage of this process, when a mono-olefin of relatively high molecular weight, such as nonene, decene, and related higher olefins, is employed as the alkylating agent, is that it must be carried out by using an appropriate amount of mono-olefin so that its vapor pressure is sufficiently high to cause the olefin vapor to pass out of the top of the reactor and accomplish counter-current flow with the down flowing phenolic body. Moreover, in order to achieve worth while commercial yields of the alkylated phenolic body, it is necessary to employ an acid activated montmorillonite clay prepared by treating an acid activatable non-swelling bentonite, which is normally employed as a cracking catalyst in the petroleum industry. Another disadvantage of this method is the expense in providing a specialized reactor which will assure the upwardly flowing mono-olefin vapor at a ratio such that the space velocity (volumes of phenol/volume of catalyst/hour) in the reactor is from about ¼ to 2.

The other general method consists of alkylating phenolic bodies with chlorinated hydrocarbons in the presence of aluminum metal or a Friedel-Crafts catalyst, such as anhydrous aluminum chloride, at a temperature ranging from 100 to 200° C. until the evolution of hydrogen chloride is negligible. Regardless whether aluminum metal or anhydrous aluminum chloride is employed as the catalyst, the process involves filtering the hot reaction products to obtain a filtrate and filter cake comprising aluminum salts, recovering the alkylated phenolic body and unreacted phenolic body and filter cake as catalyst for further alkylation reaction. Despite the fact that aluminum metal costs considerably less than anhydrous aluminum chloride, nevertheless an aluminum salt is formed in the alkylation reaction which must be recovered and traces thereof present in the alkylated product deactivated.

It is the principal object of the present invention to provide a simple and economical method of alkylating hydroxy aromatic compounds which does not require costly equipment or involves the difficulties attendant with the use of aluminum metal or Friedel-Crafts catalyst.

Other objects and advantages will become evident from the following description:

We have found that mono-halogenated alkyl halides are readily reacted with hydroxy aromatic compounds to form alkylated hydroxy aromatic compounds by simply employing as the catalyst any raw clay of the silica-alumina type, such as bentonites, diatomaceous earth, Fuller's earth, silica-alumina natural clays, montmorillonite clays, etc. without any prior activation. The economy of utilizing such unactivated clays, which comprise one of the most plentiful and least expensive natural raw products available to the chemical industry, is self-apparent.

In carrying out our improved process, a mono-halogenated hydrocarbon containing from 2 to 30 carbon atoms is gradually added to a pre-heated mixture of a hydroxy aromatic compound and raw (unactivated) clay of the silica-alumina type as catalyst. During the gradual addition, which may take from about ½ to 8 hours depending upon the amounts of the reactants employed, hydrogen halide is evolved. The mixture is pre-heated to a temperature ranging from about 100° to about 175° C. and maintained within this range during the addition of the mono-halogenated hydrocarbon. After the addition of the mono-halogenated hydrocarbon is complete and the evolution of hydrogen halide is negligible or has ceased, the mixture is maintained within the aforestated temperature for a period of time ranging from 1 to 24 hours at atmospheric, sub or super atmospheric pressure ranging from about 1 to about 200 p.s.i., to complete the alkylation reaction. The reaction mixture may be cooled, filtered, made alkaline (pH of 7.1 or slightly above) with an alkali hydroxide or carbonate and then distilled in vacuo. As an alternative, the reaction mixture may be subjected to vacuum distillation with or without prior filtration. The yields of alkylated products obtained range from 70% to about 95%.

The mole ratio of mono-halogenated hydrocarbon to hydroxy aromatic compound in admixture with the raw clay can vary from 1 mole of hydroxy aromatic compound to 10 moles of the mono-halogenated hydrocarbon and from 1 mole of mono-halogenated hydrocarbon to 10 moles of hydroxy aromatic compound. In our preferred alkylation reaction we employ between 1 and 3 moles of hydroxy aromatic compound to 1 mole of mono-halogenated hydrocarbon, i.e. alkyl halide of from 2 to 30 carbon atoms. The alkyl halide may be in the form of chloride, bromide or iodide, and either as the primary, secondary or tertiary halide. However, from the aspect of economy, we prefer the chlorides. The weight of the raw (unactivated) silica-alumina clay as catalyst can vary from about 0.1 to about 10% by weight of the hydroxy aromatic compound charged. Our preference, however, is to employ from about 1 to about 3% of unactivated raw clay by weight based on the weight of the hydroxy aromatic compound charged.

As examples of hydroxy aromatic compounds that are alkylated in accordance with the present invention there may be mentioned phenol, the cresols, the ethyl phenols, iso-propyl phenols, tertiary butyl phenols, the xylenols, thymol, carvacrol, α-naphthol, β-naphthol, 2-anthrol, 5-anthrol, pyrocatechol, resorcinol, methyl resorcinol, hydroquinol, pyrogallol, phloroglucinol, hydroxyhydroquinol, 1,2-dihydroxynaphthalene, 2,3-dihydroxyanthracene, 2-hydroxyanthracene, 9-hydroxyanthracene, 1,8-dihydroxyanthranol, 1,8-dihydroxynaphthalene, etc. as is apparent, the nuclei of these compounds contain no substituents other than hydroxy and alkyl groups.

The mono-halogenated hydrocarbons, i.e. alkyl halides of from 2 to 30 carbon atoms which are employed as the alkylating agents in accordance with the process of this invention, include ethyl chloride, isopropyl chloride, n-butyl iodide, t-butyl chloride, n-amyl chloride, isoamyl chloride, 2-pentyl chloride, 1-hexyl bromide, 2-octyl chloride, 1-nonyl chloride, 1-decyl chloride, 3-bromo-decane, 3-chloro-pentadecane, 2-hexacosyl chloride, 3-chloro-pentadecane, 2-octadecyl chloride, 4-dodecyl chloride, 3-dodecyl chloride, 7-pentadecyl chloride, 5-chloroeicosane, 8 - chloro-pentacosane, 6-chloro-heptacosane, 2-chloro-triacontane, 3-chloro-triacontane, 1-myricyl chloride and the like. In connection with these alkyl halides, it is to be noted that the location or position of the halide in the alkyl chain is immaterial. Regardless of the position, the alkyl halide will function as the alkylating agent.

The practice of our improved process is best described by the following examples which are merely illustrative and are not intended as limitations to the scope of the invention. All parts given are by weight unless otherwise noted.

EXAMPLE I

A mixture of phenol (188 grams; 2 moles) and #49 Voldeg Bentonite (2 grams)—Whittaker, Clark & Daniels—was heated to 150°–155° C., 2-octyl chloride (149 grams, 1 mole) was added over 6 hours during which time hydrogen chloride was evolved. After the addition was complete, the mixture was maintained at 150°–155° C. for 16 hours, cooled, filtered, made alkaline with caustic soda to a pH of 7.1 and distilled in vacuo to yield 189.5 grams (92%) of octylphenol. Hydroxyl No. found—270; calculated—273.

EXAMPLE II

To a heated mixture of phenol (94 grams, 1 mole) and GB 100 Syobond Bentonite (3 grams)—Archer, Daniels & Miles—maintained at a temperature of 165°–170° C., there were added 17.7 grams (0.1 mole) of 1-decyl chloride over ½ hour. When the addition was complete, the mixture was refluxed 5 hours at 165°–170° C. and distilled in vacuo without filtration to yield 19.1 grams (85%) of decylphenol.

EXAMPLE III

A mixture of phenol (94 grams, 1 mole) and Aquagel Bentonite (0.7 grams)—Baroid Division of National Lead—was heated to 165–175° C., 2-hexacosyl chloride (4020 grams, 10 moles) was added over 4 hours and the mixture heated 15 hours at 165°–175° C. A 91.7% yield of a monosubstituted hexacosylphenol was obtained on distillation.

EXAMPLE IV

To a heated mixture (130°–140° C.) of α-napthol (144 grams, 1 mole) and Celite 503 (2 grams)—Johns-Manville—was added 2-octadecyl bromide (333 grams, 1 mole) over 2 hours. When the addition was complete, the mixture was heated for one hour and worked up as described in Example I. There was obtained on distillation a 79% yield of octadecyl-naphthol.

EXAMPLE V

To a mixture of phenol (188 grams, 2 moles) and Celite 315 (18.8 grams, 10% by weight)—Johns-Manville—at 100° C. in a stainless steel autoclave, was added t-butyl chloride (926 grams, 10 moles) over 6½ hours. Whenever the pressure of the auto-clave reached 100 p.s.i.g. the addition was stopped, the reaction mixture cooled with water to 0° C. and the hydrogen chloride vented. The autoclave was closed, reheated to 100° C. and the addition resumed. The latter procedure was continued until the addition of the t-butyl chloride was complete. When the addition was complete, the system was opened to the atmosphere, heated for 3½ hours at 100° C. and distilled without filtration as in Example I to yield 84% of t-butylphenol.

EXAMPLE VI

To a heated mixture (120°–130° C.) of phenol (188 grams, 2 moles) and Voldeg Bentonite (2 grams)—Whittaker, Clark, and Daniels—was added 4-dodecyl chloride (204 grams, 1 mole) over 1 hour. The mixture was then heated 1 hour at the same temperature and worked up as in Example I to yield 92% of dodecylphenol.

EXAMPLE VII

To a heated mixture (150°–160° C.) of p-cresol (216 grams, 2 moles) and GB100 Syabond Bentonite (1 gram)—Archer, Daniels, and Miles—was added 3-dodecyl chloride (205 grams, 1.16 mole) over 2 hours. After the addition was complete, the mixture was heated 6 hours at the same temperature and worked up as described in Example I. An 84.8% yield of a dodecylcresol was obtained upon distillation.

EXAMPLE VIII

Example VI was repeated with the exception that 7-pentadecyl chloride (246 grams, 1 mole) was substituted for 204 grams (1 mole) of 4-dodecyl chloride. After filtration—followed by distillation—there was obtained an 86.4% yield of a pentadecyl phenol.

EXAMPLE IX

Operating as in Example I, 188 grams (2 moles) of phenol was substituted by 388.4 grams (2 moles) of anthrol to yield 215 grams of monooctyl substituted 2-anthrol in 69% yield.

EXAMPLE X

Operating as in Example VII, 3-dodecyl chloride was substituted by 456 grams (1 mole) of 12 triacontyl chloride to yield 375 grams (71.5%) of a triacontyl-p-cresol.

We claim:

1. A method of preparing an alkylated hydroxy aromatic compound which comprises adding from 1 to 10 moles of a mono-halogenated alkyl hydrocarbon of from 2 to 30 carbon atoms wherein the halogen is selected from the group consisting of chlorine, bromine and iodine during a time interval of from about ½ to 8 hours to a reaction mixture maintained at a temperature ranging from about 100° C. to about 250° C. and consisting of 1 to 10 moles of a hydroxy aromatic compound containing from 1 to 3 hydroxy groups directly attached to the aromatic nucleus said nucleus containing no substituents other than hydroxy and alkyl groups and from about 0.1 to about 10% by weight of said hydroxy aromatic compound of raw clay of the silica-alumina type, maintaining the said temperature within the said range for a period of time ranging from 1 to 24 hours, and isolating the alkylated hydroxy aromatic compound from the said reaction mixture.

2. A method of preparing octylphenol which comprises adding 1 mole of 2-octyl chloride over 6 hours to a reaction mixture maintained at 150–155° C. and consisting of 2 moles of phenol and about 1% by weight of said phenol of raw clay of the silica-alumina type, maintaining the said temperature for 16 hours, and isolating the octylphenol from the said reaction mixture.

3. A method of preparing decylphenol which comprises adding 0.1 mole of 1-decyl chloride over ½ hour to a reaction mixture maintained at a temperature of from 165°–170° C. and consisting of 1 mole of phenol and about 3% by weight of said phenol of raw clay of the silica-alumina type, maintaining the said temperature for 5 hours, and isolating the decylphenol from the said reaction mixture.

4. A method of preparing hexacosylphenol which comprises adding 10 moles of 2-hexacosyl chloride over 4 hours to a reaction mixture maintained at 165°–175° C. and consisting of 1 mole of phenol and about 0.75% by weight of said phenol of raw clay of the silica-alumina type, maintaining the said temperature for 15 hours, and isolating the hexacosylphenol from said reaction mixture.

5. A method of preparing octadecyl-α-naphthol which comprises adding 1 mole of 2-octadecyl bromide over 2 hours to a reaction mixture maintained at a temperature of 130°–140° C. and consisting of 1 mole of α-naphthol and about 1.4% by weight of said α-naphthol of raw clay of the silica-alumina type, maintaining the said temperature for 1 hour, and isolating the octadecy-α-naphthol from said reaction mixture.

6. A method of preparing t-butylphenol which comprises adding 10 moles of t-butyl chloride over 6½ hours to a reaction mixture maintained at 100° C., a pressure of 100 p.s.i.g., and consisting of 2 moles of phenol and about 10% by weight of said phenol of raw clay of the silica-alumina type, periodically cooling to 0° C. to vent the hydrogen chloride formed, maintaining the said temperature for 3½ hours at atmospheric pressure, and isolating the t-butyl phenol from said reaction mixture.

7. A method of preparing dodecylcresol which comprises adding 1.16 moles of 3-dodecyl chloride over 2 hours to a reaction mixture maintained at a temperature of 150°–160° C. and consisting of 2 moles of p-cresol and about 0.47% by weight of said p-cresol of raw clay of the silica-alumina type, maintaining the said temperature for 6 hours, and isolating the dodecylcresol from the said reaction mixture.

8. A method of preparing pentadecylphenol which comprises adding 1 mole of 7-pentadecyl chloride over 1 hour to a reaction mixture maintained at a temperature of 120°–130° C. and consisting of 2 moles of p-cresol about 0.47% by weight of said phenol of raw clay of the silica-alumina type, maintaining the said temperature for 1 hour, and isolating the pentadecylphenol from said reaction mixture.

9. A method of preparing dodecylphenol which comprises adding 1 mole of 4-dodecyl chloride over 1 hour to a reaction mixture maintained at a temperature of 120°–130° C. and consisting of 2 moles of phenol and about 1% by weight of said phenol of raw clay of the silica-alumina type, maintaining the said temperature for 1 hour and isolating the dodecylphenol from said reaction mixture.

10. A method of preparing an alkylated hydroxy aromatic compound which comprises adding one mole of a monohalogenated alkyl hydrocarbon of from 2 to 30 carbon atoms during a time interval of from about 1 to about 3 hours to a reaction mixture maintained at a temperature of about 100° C. to about 175° C. and consisting of from 1 to 3 moles of hydroxy aromatic compound and from about 1 to about 3% by weight of said hydroxy aromatic compound of raw clay of the silica-alumina type, maintaining the said temperature within the said range for a period of time ranging from 1 to 24 hours and isolating the alkylated hydroxy aromatic compound from the said reaction mixture.

No references cited.

LEON ZITVER, *Primary Examinner.*

W. B. LONE, *Assistant Examiner.*